Dec. 22, 1925.
H. A. FRETTS
1,566,471
ROTARY PLOWSHARE PULVERIZER
Filed Jan. 5, 1925      2 Sheets-Sheet 2
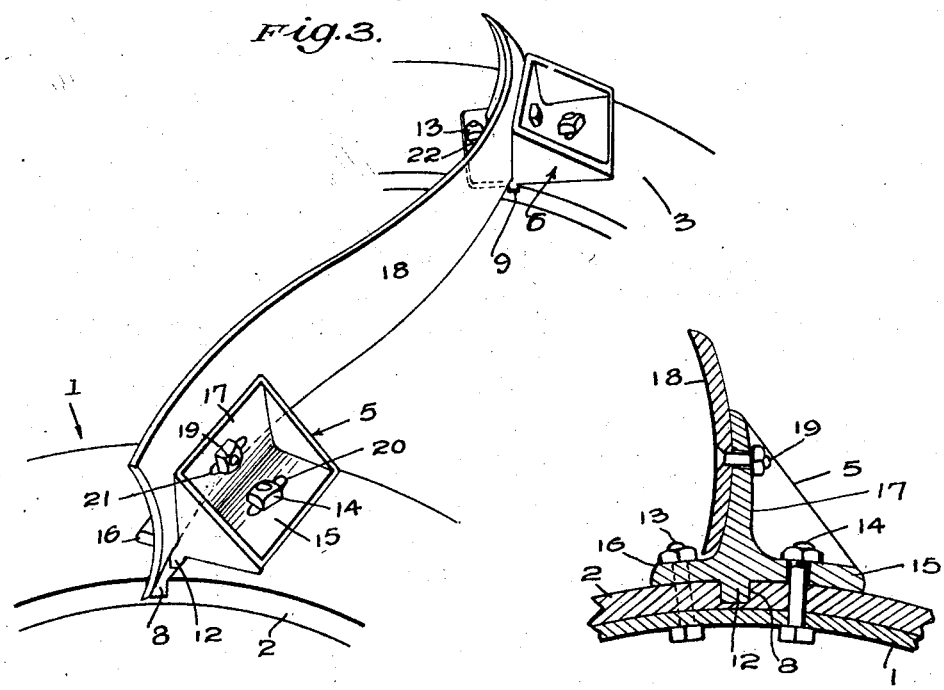
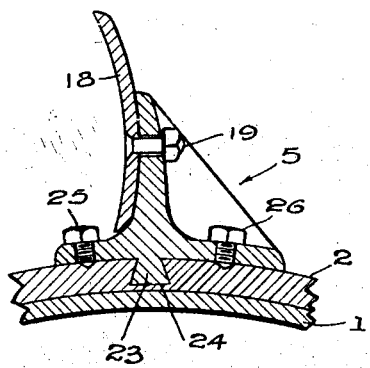
INVENTOR
HENRY A. FRETTS
BY
ATTORNEY Patented Dec. 22, 1925.

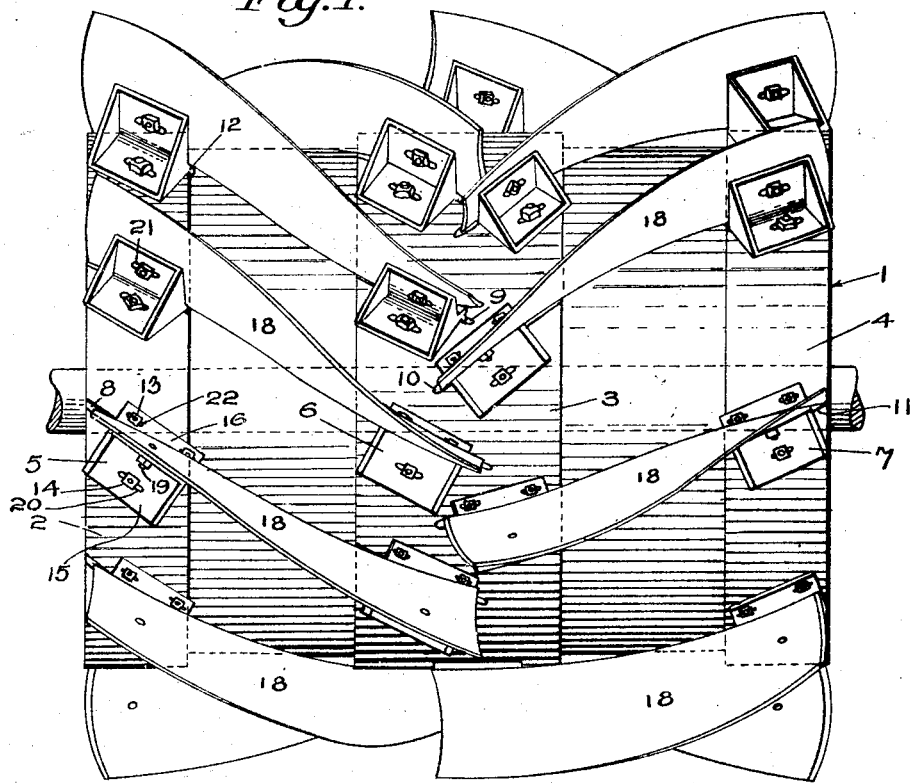

1,566,471

UNITED STATES PATENT OFFICE.

HENRY A. FRETTS, OF SACRAMENTO, CALIFORNIA.

ROTARY PLOWSHARE PULVERIZER.

Application filed January 5, 1925. Serial No. 488.

*To all whom it may concern:*

Be it known that I, HENRY A. FRETTS, a citizen of the United States, and a resident of the city and county of Sacramento and State of California, have invented certain new and useful Improvements in Rotary Plowshare Pulverizers, of which the following is a specification.

The present invention relates to agricultural implements, and more particularly to those adapted to subsoiling and soil pulverization and provided with a tractor, or other power-driven machine, for their operation.

A principal object of the invention is to provide a rotary subsoiler and pulverizer constructed along scientific lines and adapted to insure complete turning and pulverization of the soil.

Another object of the invention is the provision, in a pulverizer of the character specified, of a rotor carrying peripherally a plurality of helicoidal blades, or cutters, spirally arranged and extending from extremity to extremity of the rotor, or in reverse order of arrangement and extending from either extremity of the rotor to beyond its center and in overlapping relationship and adjustable securement relative to each other.

A further object is to provide, in a pulverizer of rotary character, a rotor bearing helical-shaped steel plowshare cutters spirally and circumferentially arranged thereabout, the rotary action of which is adapted to turn the surface soil down and the underlying soil up, thoroughly mixing soil and compost and cutting plant roots, to the better advantage of crop production.

Means are provided for the lateral adjustment, in the spiral grooves carried by the rotor, of the cutters relative to each other and, also, to the rotor, to meet the varying requirements of soil condition.

Other objects and advantages of the invention will appear with reference to the accompanying two sheets of drawings and subjoined specification, in which:—

Figure 1 is a side elevation of my invention, showing the rotor and the arrangement thereon of the helicoidal cutter blades;

Figure 2 is a fragmentary elevation, showing the arrangement of the supporting brackets and the curved shape of the cutters borne and supported thereby;

Figure 3 is a perspective view of a cutter blade and the bracket mountings therefor;

Figure 4 is an enlarged detail of a cutter bracket, or mounting, of simple design; and Figure 5 is an enlarged detail of another form of a cutter bracket provided with a tongue adapted to be slidably secured in a groove of dove-tail shape in cross-section.

Referring more particularly to the drawings, my invention is comprised of a rotor 1 of any suitable dimensions, the diameter being, preferably, about two-thirds that of the length, and consisting of a cylindrical shell having a plurality of circumferential spacing ribs 2, 3 and 4 adapted for the mounting of a plurality of cutter braces, or brackets, 5, 6 and 7, preferably arranged helically, or spirally, about the peripheral surface of the rotor 1 from end to end, or, as shown in Figure 1, spirally arranged from near both ends of the rotor in reverse courses and extending beyond its center in staggered, or overlapping, relationship.

The ribs 2, 3 and 4 are provided with spirally arranged grooves 8, 9, 10 and 11 into which tongues 12, formed on the undersides of the brackets 5, extend and are adjustably maintained in their positions by means of bolts 13 and 14, which clamp the brackets to the rotor 1.

The brackets 5 have rearwardly and forwardly extending flanges 15 and 16, and upwardly extending webs 17 conforming to the curvature of the cutters 8 and to which the cutters are bolted by means of bolts 19. The bolt openings 20, 21 and 22 in the brackets 5 are of slot formation, permitting lateral adjustment of these brackets in the grooves 8, 9, 10 and 11 and relative adjustment of the cutters 18. One of the cutters is shown in detail in Figure 3, and comprises a peculiarly shaped steel blade of substantially reverse curvature, tilted slightly in the direction of travel and forming substantially a rotary plowshare adapted to shear into the soil, turning the surface under and that lying under on top, the reverse action of the cutters tending to force the cut soil toward the center of the rotor, thereby completely pulverizing and evenly distributing the soil passed over.

The reversed arrangement of the helicoidal shaped cutters operate to work the soil toward the center of the rotor from either end, the soil, as left by one cutter, being picked up by the following cutter, the successive cutter actions serving to accomplish thorough soil disintegration and uniform distribution, while the staggered, or overlapping, arrangement of the inner ends of the cutters provide for ample clearance in working damp or mucky soils.

In the construction shown in Figure 5, the tongues of the brackets are shaped to conform to the dove-tailed grooves 24, formed in the rotor, and the brackets held in place by means of set-screws 25 and 26.

It is of prime importance that the cutters be shaped to conform to the outer contour of the rotor surface and that they be spaced slightly away therefrom, by means of flanges 16 of the brackets, allowing clearance through which excess material may pass.

The curvature of the plowshare-like cutters is of the utmost importance, in that it is possessed of decided advantages over the ordinary straight-edge cutters employed in the construction of the usual rotary pulverizer.

Having thus described my invention, I claim, and desire to secure by Letters Patent:

1. In a device of the character described, a rotor, a plurality of helicoidal-shaped cutters mounted upon the rotor, but spaced therefrom and extending spirally thereabout, and means for the lateral adjustment of said cutters with respect to said rotor.

2. In a device of the character described, a rotor, a plurality of spirally arranged brackets mounted circumferentially about said rotor, helicoidal-shaped cutters upon said brackets, and means for the adjustment laterally on the rotor of said brackets and cutters.

3. In combination with the rotor of a rotary pulverizer, a plurality of ribs arranged exterior the said rotor and carried thereby and provided with spirally arranged grooves, brackets adapted to fit in said grooves, spirally arranged cutters mounted upon said brackets and provided with reversed-curve cutting edges, and means permitting the oblique movement of said brackets in said grooves in effecting the adjustment of said cutters.

4. A rotary pulverizer comprising a rotor, a plurality of obliquely adjustable cutters mounted circumferentially upon said rotor and extending spirally thereabout, said cutters comprising elongated blades having reversed-curve cutting edges and of substantially scoop-shape in cross-section, and means whereby said blades may be adjusted obliquely about the rotor.

5. A rotary pulverizer comprising a rotor, a plurality of obliquely adjustable cutters mounted upon said rotor and extending spirally from one end thereof toward the center, and a plurality of like cutters extending from the opposite end and also toward the center but in reversed direction from that of those first mentioned and with inner ends in staggered relationship with the inner ends of the first mentioned ones, said cutters having reversed-curve cutting edges and curved surfaces substantially in the form of plowshares.

HENRY A. FRETTS.